May 8, 1951 B. J. MAYLAND ET AL 2,552,198
EXTRACTION OF HYDROCARBON TYPES
Filed July 12, 1948
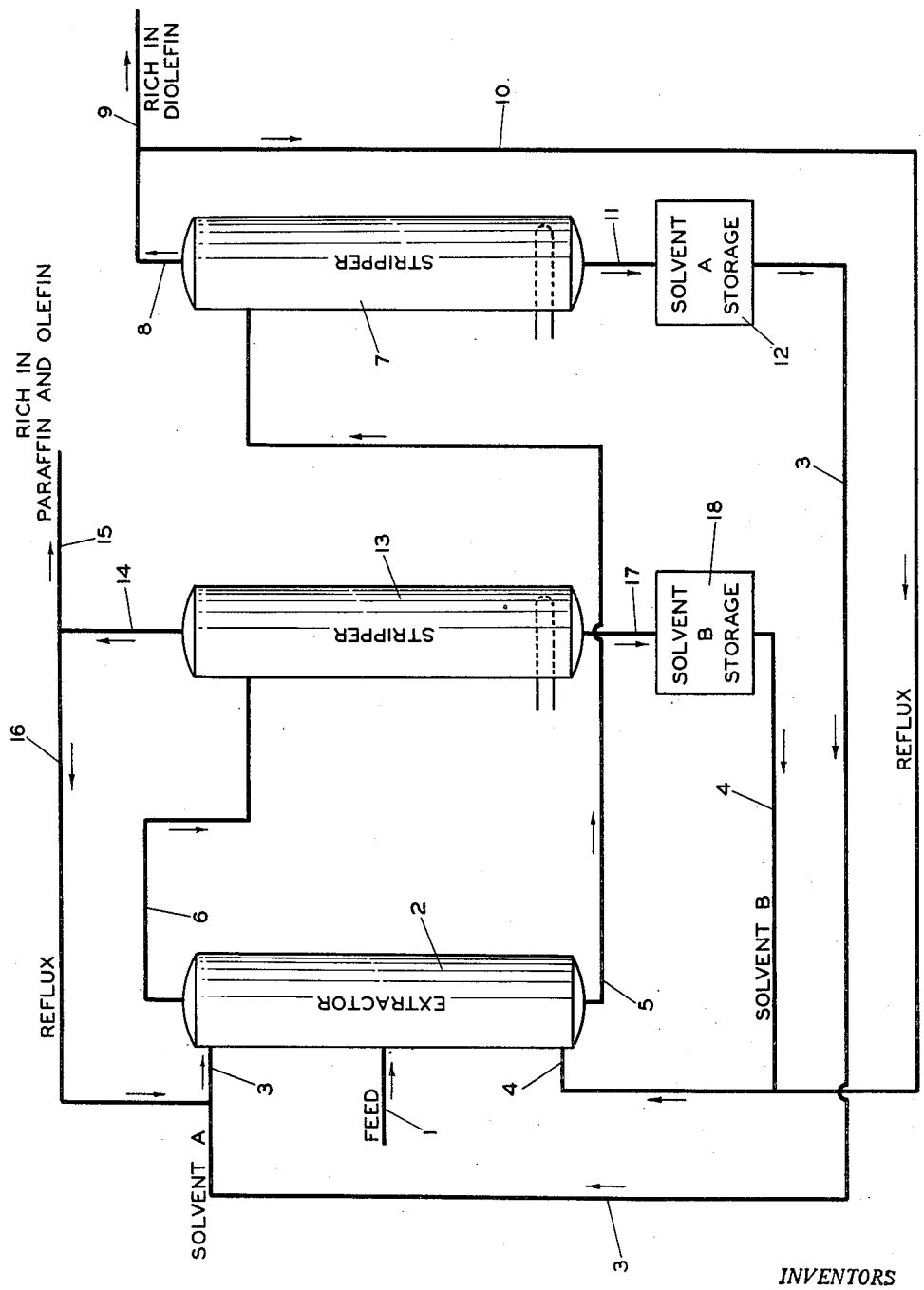
INVENTORS
B. J. MAYLAND
E. E. WHITE
BY
Hudson and Young
ATTORNEYS

UNITED STATES PATENT OFFICE 2,552,198

EXTRACTION OF HYDROCARBON TYPES

Bertrand J. Mayland, Bartlesville, Okla., and Edward E. White, Covington, Va., assignors to Phillips Petroleum Company, a corporation of Delaware Application July 12, 1948, Serial No. 38,273

7 Claims. (Cl. 260—676)

This invention relates to a process for effecting the separation of hydrocarbons of varying degrees of saturation. The process of the present invention provides a method of separating hydrocarbons based on the degree of unsaturation. In one aspect the present invention relates to a process of separating a mixture of a paraffin and an olefin into a fraction rich in the paraffin and a second fraction rich in the olefin content of the original mixture. In another aspect the present invention relates to a process for separating diolefins from more saturated hydrocarbons, usually the corresponding olefins or paraffins or both. By corresponding we mean having the same number of carbon atoms. The present invention is particularly adapted to effect the resolution of mixtures of low-boiling aliphatic hydrocarbons of different degrees of saturation and which are difficult or expensive to separate from one another by conventional means such as fractional distillation, extractive distillation and the like. The difficulty or expense of effecting separation by conventional means may be attributable either to the close-boiling relationship of the several hydrocarbons in the mixture or to the formation of an azeotrope. While the present invention is particularly applicable to mixtures of aliphatic hydrocarbons of varying degrees of saturation, it may also be applied to effect the separation of alicyclic hydrocarbons or mixtures of aliphatic and alicyclic hydrocarbons. For example the present invention might be employed to effect the separation of cyclohexane from cyclohexadiene or for separating piperylene from cyclopentene. The present invention is applicable to the separation of mixtures of difficultly separable hydrocarbons that are either gaseous or relatively low-boiling at normal conditions, and the invention is particularly applicable to the separation of mixtures of hydrocarbons containing a maximum of about six carbon atoms per molecule.

The separation of olefins, diolefins and paraffins, whether aliphatic or alicyclic, usually cannot be accomplished in a simple and inexpensive manner because of the close boiling range of the compounds or because of the tendency to form azeotropes, or both. For example the separation of butadiene from n-butane is not possible by ordinary fractionation due to the formation of a n-butane-butadiene constant-boiling mixture or azeotrope. Similarly it is impossible to separate by ordinary fractionation butadiene from isobutylene or from 1-butene because of the extreme closeness of the boiling points.

The problem has been solved to some extent at least by the use of azeotropic or extractive distillation whereby another component is added to the system which makes possible the separation by changing the relative volatilities of the hydrocarbons. In azeotropic distillation the added component is commonly known as an entraining agent, and in extractive distillation it is commonly termed a selective solvent. Generally, a greater change in relative volatilities is obtained by adding a component of higher selectivity. Polar compounds (which may be defined as compounds having high dipole moment and high internal solution pressure) are used as selective solvents for extractive distillation, and, in general, the greater the polarity of the selective solvent, the greater the selectivity but the lower the solvent power or capacity. To decrease the height of the column necessary to effect the desired separation in an extractive distillation process a highly selective solvent is desired. On the other hand, the hydrocarbon must have a moderate solubility in the selective solvent to limit the amount of solvent to be added and to keep the diameter of the column within reasonable limits. The polar solvent chosen represents a compromise between these two extremes, and selectivity is sacrificed for solvent power or capacity.

Other objections to extractive distillation and azeotropic distillation are the extremely large amount of heat required to effect the separation and the complexity introduced into the system as compared with simple fractional distillation or liquid-liquid extraction. For example when azeotropic distillation is employed it is necessary to separate the entraining agent from the fractions obtained by the distillation. Recovery of the entrainer is often very complicated and expensive. In the case of extractive distillation, it is necessary to employ stripping equipment to strip the dissolved hydrocarbon from the solvent. Furthermore, a solvent which has been adopted commercially for extractive distillation of hydrocarbons is furfural which causes some difficulty due to corrosion of the equipment and to polymerization of the furfural which necessitates the addition of a re-run unit in order to continuously remove polymer and other impurities from the furfural in the system.

The separation of hydrocarbon mixtures into the components thereof can be effected by liquid-liquid extraction using a polar solvent in which the more unsaturated hydrocarbons are preferentially soluble. Liquid-liquid extraction usually results in a greater saving in energy requirements to bring about the separation as compared with the larger heat consumption of extractive distillation for example. However, because of the low efficiency of liquid-liquid contacting devices, a solvent of high selectivity is necessary in order for the process to be practical. The degree of selectivity obtainable with any practical polar solvent is limited by the necessity that the solvent have sufficient capacity for dissolving the hydrocarbon.

In the usual liquid-liquid extraction process the solvent comprises one phase and the hydrocarbon mixture the other phase. The polar solvent preferentially dissolves the more polar hydrocarbon, i. e., the more unsaturated hydrocarbon, leaving the hydrocarbon phase richer in the less polar (more saturated) hydrocarbon, and the net selectivity of the liquid-liquid system depends on the selectivity of the solvent. The net selectivity of the system can be increased by adding another component soluble in the hydrocarbon phase which other component is selective for the less polar hydrocarbon. The use of two immiscible solvents, one selective for the more polar hydrocarbon and the other selective for the less polar hydrocarbon, is called the dual solvent or double solvent process. This double solvent process is extremely limited in its application, particularly for the separation of aliphatic and alicyclic hydrocarbons of different degrees of saturation. This limitation is due to the small number of known solvent pairs suitable for practical or commercial use in such a process.

An object of the present invention is to provide an improved process for resolving a mixture of hydrocarbons of varying degrees of saturation. Another object is to provide an improved process for effecting resolution of a mixture of aliphatic and/or alicyclic hydrocarbons of varying degrees of saturation. Another object is to provide an improved process of resolving a mixture of paraffins and olefins. Another object is to provide an improved process of separating diolefins from more saturated hydrocarbons, especially hydrocarbons which correspond in number of carbon atoms per molecule. Another object is to provide an improved method of separating butane from butene. Another object is to provide an improved method of separating butadiene (which term as used herein means 1,3-butadiene) from butene or butane or both. Another object is to provide improved solvent pairs for effecting separation of hydrocarbons based on the degree of unsaturation, which solvent pairs separate in accordance with the dual solvent or double solvent manner. Many other objects will more fully hereinafter appear.

The accompanying drawing portrays diagrammatically one arrangement of equipment which is very satisfactory for effecting the separation of a diolefin from a paraffin or an olefin or both in accordance with the principles of the present invention.

We prefer to employ a pair of solvents which are immiscible with each other, one of the solvents being a polar solvent which is selective for the more unsaturated portion of the hydrocarbon mixture and the other being a liquid which is selective for the more saturated hydrocarbon portion of the mixture. The last-named solvent is less polar and preferentially dissolves the more saturated portion of the mixture whereas the polar solvent is more polar and preferentially dissolves the more unsaturated portion of the incoming hydrocarbon mixture to be resolved.

A preferred example of the polar solvent is betahydroxypropionitrile, but this is merely a preferred solvent and, since other polar solvents may be used effectively in our process, our invention should not be limited to this one specific solvent. Among other polar solvents that may be used in practicing our invention are aniline, ethylene chlorhydrin, glycol monoethyl ether, glycerol, toluidine, pyridine, phenylhydrazine, furfural, nitrobenzene, benzaldehyde, benzonitrile, etc. and/or mixtures of these polar compounds.

Examples of the second solvent, i. e., the solvent which is less polar or relatively non-polar, are the straight-chain aliphatic olefins having from 8 to 12 carbon atoms per molecule, such as caprylene (1-octene), nonylene, decylene, undecylene and dodecylene. Another material which may be employed as the second solvent is decalin. When decalin is used, however, it is preferred that the polar solvent be noncyclic.

We find that exceedingly good results can be obtained by the use of a pair of solvents such as have been described and will be more fully described below. Such solvents are employed in a manner similar to that which is known as the dual solvent or double solvent process. In accordance with the dual solvent process the incoming hydrocarbon mixture is subjected to simultaneous extraction with two liquid solvents which are immiscible with each other, one of these solvents selectively dissolving the more saturated hydrocarbon content of the feed and the other solvent selectively dissolving the more unsaturated hydrocarbon content of the feed. In practice two phases only are present since the incoming hydrocarbon distributes itself between the two immiscible solvent phases. Also in practice each solvent phase is saturated with the solvent of the other phase.

The liquid-liquid double solvent extraction process is most conveniently carried out in a vertical extraction column of the usual type provided with the usual means for effecting intimate contacting between the two phases. The heavier solvent is continuously fed into the top of the extraction column while the lighter solvent is fed into the bottom. The two solvent phases contact each other countercurrently as they pass through the column. The feed is introduced at an intermediate point in the column, usually at the mid-point. The lighter phase is withdrawn continuously from the top of the column while the heavier solvent phase is withdrawn continuously from the bottom. Each of the solvent phases is passed to its own stripping unit where the dissolved hydrocarbon is removed therefrom in the conventional manner.

The relative proportions of the two immiscible solvents constituting the solvent pair may vary widely and depend upon the relative concentrations or proportions of the components of different types in the incoming feed. We employ such relative proportions of the two solvents that two phases are maintained in the extraction zone.

The temperature of extraction may similarly vary widely but should be such that two phases exist in the extraction system. The temperature of extraction may conveniently be atmospheric, say from 50° F. up to 100° F. The pressure at which the extraction is conducted is preferably as nearly atmospheric as is possible. In some cases it may be necessary to employ superatmospheric pressure in order to maintain the incoming hydrocarbon feed in the liquid phase.

We have found that a pair of solvents in which one solvent is beta-hydroxypropionitrile and the other solvent is caprylene is highly advantageous for separating olefins from paraffins. A solvent such as caprylene is selective toward paraffins in preference to olefins, for example toward n-butane in preference to 1-butene. With a relatively non-polar compound such as caprylene, n-butane is more soluble than 1-butene due to the lower volatility of n-butane. However, in the case of caprylene the difference in solubility is considerably greater than that solely due to the difference in volatility. This is illustrated by the following data.

*Table A*

[Solvent: Caprylene—1 atm., 85° F.]

|  | Mol Fraction | Calc. Activity Coef. of Hydrocarbon | Selectivity |
| --- | --- | --- | --- |
| n-Butane | .291 | 1.31 | 1.06 |
| 1-Butene | .229 | 1.39 | 1.00 |
| 1,3-Butadiene | .302 | 1.097 |  |

The activity coefficient of n-butane in caprylene is seen to be less than that of 1-butene in the same solvent. This indicates that caprylene is selective for n-butane in preference to 1-butene.

Data on the solvent betahydroxypropionitrile by itself are shown in the following table.

[Solvent: Betahydroxypropionitrile—1 atm., 85° F.]

|  | Mol Fraction | Calc. Activity Coef. of Hydrocarbon | Selectivity | |
| --- | --- | --- | --- | --- |
| n-Butane | .00431 | 88.4 | 1.00 | |
| 1-Butene | .00894 | 35.1 | 2.48 | 1.00 |
| 1,3-butadiene | .0234 | 14.15 | 6.25 | 2.51 |

From the data given in this table it will be seen that the selectivity of betahydroxypropionitrile for a separation between 1-butene and n-butane is extremely good. This is indicated by the activity coefficient of 1-butene being very much less than the activity coefficient of n-butane. It will also be seen that the selectivity of this solvent for a separation between butadiene and 1-butene is extremely good.

From the data given for betahydroxypropionitrile and for caprylene, it will be seen that the selectivity (ratio of the partition coefficient of 1-butene and n-butane) of the combination of caprylene and betahydroxypropionitrile is approximately $$2.48 \times \frac{1.39}{1.31} = 2.63$$

This is an improvement of 6 per cent over the polar solvent betahydroxypropionitrile which by itself is known to be an effective solvent medium for the separation of mixtures of hydrocarbons.

In one aspect therefore our invention involves separating mixtures of paraffins and olefins by subjecting such mixtures to liquid-liquid extraction with two solvents which are immiscible with each other, one of the solvents being betahydroxypropionitrile and the other being a $C_8$ to $C_{12}$ aliphatic olefin, preferably caprylene. In this way preferential solution of the olefin content in the betahydroxypropionitrile is effected simultaneously with preferential solution of the paraffin content of the mixture in the caprylene. By separating the resulting phases from one another resolution of the mixture into a fraction rich in paraffin and a fraction rich in olefin is effected.

We have further found that the solvent decalin (decahydronaphthalene) shows excellent selectivity for paraffins and olefins with respect to diolefins. In accordance with our invention decalin may be used in conjunction with a polar solvent, such as betahydroxypropionitrile, in the manner of the dual solvent process to separate paraffins or olefins or paraffins and olefins from diolefins. The data for decalin with respect to n-butane, 1-butene and butadiene is as follows.

*Table C*

[Solvent: Decalin—1 atm., 85° F.]

|  | Mol Fraction | Calc. Activity Coef. of Hydrocarbon | Selectivity |
| --- | --- | --- | --- |
| n-Butane | .292 | 1.31 | 1.04 |
| 1-Butene | .246 | 1.29 | 1.05 |
| 1,3-Butadiene | .243 | 1.36 | 1.00 |

It will be seen that the selectivity of a solvent combination of decalin and betahydroxypropionitrile for the separation of 1-butene and butadiene is $$2.51 \times \frac{1.36}{1.29} = 2.65$$

an improvement of approximately 6 per cent over betahydroxypropionitrile alone.

In still another aspect of our invention therefore dolefins may be separated from more saturated hydrocarbons namely paraffins or olefins or both, by simultaneous extraction in liquid-liquid phase with betahydroxypropionitrile and decalin whereby the diolefin content of the incoming feed is selectively dissolved in the betahydroxypropionitrile phase while the more saturated hydrocarbon content of the feed is selectively dissolved in the decalin phase.

A typical process for the separation of a diolefin from admixture with at least one olefin and at least one paraffin such as for separating butadiene from an aliphatic $C_4$ hydrocarbon stream containing same in admixture with butene and butane, is shown diagrammatically in the accompanying drawing. The hydrocarbon feed in liquid form enters the system via line 1 and is fed directly into liquid-liquid extractor 2 which is preferably a vertical column of conventional type equipped with the usual bubble plates, baffles, packing or the like means for promoting intimate contact between the two phases. The feed enters the column 2 at an appropriate point near the center of the column. Solvent A and solvent B are introduced at opposite ends of column 2 via lines 3 and 4 respectively. Solvent A may consist of betahydroxypropionitrile saturated with decalin while solvent B may consist of decalin saturated with betahydroxypropionitrile. The two solvent phases are contacted countercurrently in column 2, solvent A moving down the column in intimate relationship with ascending solvent B. The diolefin, for example butadiene, is selectively dissolved by solvent A while the paraffin and olefin, e. g. butane and butene are selectively dissolved by solvent B. Solvent A containing the butadiene concentrate leaves the bottom of the column via line 5 while solvent B containing the mixture of paraffin and olefin stripped from the diolefin leaves the top of the column via line 6.

The diolefin-enriched solvent A phase is passed via line 5 to stripper column 7 which is of conventional design and serves to recover the diolefin concentrate overhead via line 8 whence it may be withdrawn from the system via line 9. A suitable portion of the diolefin concentrate is returned as reflux via line 10 to the bottom of column 2 where it serves to enhance the degree of separation by displacing dissolved butene and butane from the enriched solvent A withdrawn via line 5. As is indicated in the drawing, the returned reflux may conveniently be merged with the incoming stream of solvent B flowing in line 4. Alternatively the reflux may be introduced into the bottom of column 2 by a separate line (not shown).

It will be obvious that stripper 7 is provided at its bottom with the usual reboiling means for supplying the heat required for stripping and may be provided with means for condensing the overhead vapors leaving via line 8. The reflux returned via line 10 to column 2 should be in liquid form. If desired, a portion of the condensed overhead vapors from stripper 7 may be returned to the extreme top of stripper 7 to prevent loss of solvent in the overhead. In such case line 5 carrying the rich solvent A will enter column 7 a few trays below the top in order to allow the trays above the point of feed entry to effect condensation of any volatilized solvent.

The stripped solvent A leaves the bottom of stripper 7 via line 11 and after cooling to a suitable temperature is passed to storage 12 whence it is returned to the top of column 2 via line 3.

The solvent B phase, enriched in paraffin and olefin, leaving the top of column 2 via line 6 is passed into stripper 13 where the dissolved hydrocarbon is removed by stripping in the same manner as in stripper 7. The overhead from stripper 13 leaves via line 14 and may be withdrawn from the system via line 15. It is preferred to return a portion thereof as reflux via line 16 to the top of extraction column 2. This reflux may conveniently be fed into the incoming stream of solvent A entering the top of column 2 via line 3. The reflux should be in liquid phase.

As in the case of stripper 7, it may be preferred to condense the overhead from stripper 13, flowing in line 14, and to reflux the top of stripper 13 with a portion of the resulting condensate, in order to prevent loss of solvent in the overhead vapors and loss from the system in the fraction taken off via line 15. When reflux is so introduced to the top of stripper 13, the point at which line 6 enters stripper 13 should be several trays below the top in order to enable condensation of vaporized solvent in the last few trays.

The stripped solvent B is withdrawn via line 17 and passed, after suitable cooling, to storage 18 whence it is returned via line 4 to the bottom of column 2.

In the foregoing description we have described the process with reference to a separation of diolefins from olefins and paraffins by the use of a solvent mixture of betahydroxypropionitrile and decalin. It is also within the scope of our invention that the mixture of paraffins and olefins leaving the system via line 15 may also be separated into its components, after separation from the solvent, by contacting the hydrocarbon mixture with another dual solvent pair comprising betahydroxypropionitrile and a $C_8$–$C_{12}$ straight-chain olefin, such as caprylene. Thus, our invention may be used to separate a mixture of paraffins, olefins and diolefins into its various components by using two solvent mixtures as described above.

From the foregoing description many advantages of the present invention will be seen. The principal advantage is that the invention provides a method of separating hydrocarbons of differing degrees of saturation by liquid-liquid extraction which is simple, economical and highly effective. Another advantage is that the solvents used are comparatively cheap and are readily available. Another advantage is that the invention provides new pairs of solvents which are highly effective in the dual solvent type of process for separating hydrocarbons of differing degrees of saturation. Another advantage is that the boiling points of the solvents used in accordance with the present invention are relatively high so that loss of solvent by vaporization in the stripping steps is not a series problem. Many other advantages will appear to those skilled in the art.

The solvents used in accordance with the present invention are essentially anhydrous and consist essentially of the materials disclosed i. e., a polar solvent such as betahydroxypropionitrile in conjunction with a $C_8$ to $C_{12}$ straight-chain olefin preferably caprylene, or with decahydronaphthalene.

Numerous variations of our invention will be apparent from our disclosure to one skilled in the art without going beyond the scope of our invention.

We claim:

1. A process of resolving a mixture of hydrocarbons comprising paraffins, olefins and diolefins which comprises subjecting said mixture to liquid-liquid extraction with two solvents which are immiscible with one another, one of said solvents being betahydroxypropionitrile and the other of said solvents being decalin, and thereby effecting preferential dissolution of the diolefins in said betahydroxypropionitrile and preferential dissolution of the olefins and paraffins in said decalin, separating the resulting phases from one another, separating the olefins and paraffins from said decalin, subjecting said olefins and paraffins to a second liquid-liquid extraction with two solvents which are immiscible with one another, one of said solvents being betahydroxypropionitrile and the other of said solvents being a $C_8$ to $C_{12}$ aliphatic olefin, and thereby effecting preferential dissolution of said olefins in said last-named betahydroxypropionitrile and preferential dissolution of said paraffins in said $C_8$ to $C_{12}$ aliphatic olefin.

2. A process according to claim 1 wherein the hydrocarbons to be separated contain a maximum of six carbon atoms per molecule.

3. A process according to claim 1 wherein the $C_8$ to $C_{12}$ aliphatic olefin is caprylene.

4. A process according to claim 1 wherein the hydrocarbon mixture to be resolved comprises n-butane, 1-butene and 1,3-butadiene.

5. A process of resolving a mixture of hydrocarbons comprising paraffins and olefins which comprises subjecting said mixture to liquid-liquid extraction at a temperature within the range of 50 to 100° F. with two solvents which are immiscible with one another, one of said solvents being betahydroxypropionitrile and the other of said solvents being a $C_8$ to $C_{12}$ aliphatic olefin, and thereby effecting preferential dissolution of said olefins in said betahydroxypropionitrile and preferential dissolution of said paraffins in said $C_8$ to $C_{12}$ aliphatic olefin.

6. A process according to claim 5 wherein the $C_8$ to $C_{12}$ aliphatic olefin is caprylene.

7. A process according to claim 5 wherein the hydrocarbon mixture comprises n-butane and 1-butene.

BERTRAND J. MAYLAND.
EDWARD E. WHITE.

REFERENCES CITED

The following references are of record in the file of this patent:

UNITED STATES PATENTS

| Number | Name | Date |
|---|---|---|
| 2,205,996 | Van Wijk | June 25, 1940 |
| 2,396,300 | Cummings et al. | Mar. 12, 1946 |
| 2,433,751 | Friedman | Dec. 30, 1947 |
| 2,458,067 | Friedman et al. | Jan. 4, 1949 |

FOREIGN PATENTS

| Number | Country | Date |
|---|---|---|
| 441,104 | Great Britain | Jan. 13, 1936 |